US012382231B2

(12) United States Patent
Kirchhoff

(10) Patent No.: US 12,382,231 B2
(45) Date of Patent: Aug. 5, 2025

(54) SEALING SLEEVE FOR PROTECTION OF COMPONENTS IN A HEARING DEVICE

(71) Applicant: GN Hearing A/S, Ballerup (DK)

(72) Inventor: Laurids Egedal Kirchhoff, København V (DK)

(73) Assignee: GN HEARING A/S, Ballerup (DK)

( * ) Notice: Subject to any disclaimer, the term of this patent is extended or adjusted under 35 U.S.C. 154(b) by 223 days.

(21) Appl. No.: 17/720,863

(22) Filed: Apr. 14, 2022

(65) Prior Publication Data

US 2022/0240028 A1 Jul. 28, 2022

Related U.S. Application Data

(63) Continuation of application No. PCT/EP2020/086863, filed on Dec. 17, 2020.

(30) Foreign Application Priority Data

Dec. 19, 2019 (EP) .................................... 19218208

(51) Int. Cl.
*H04R 25/00* (2006.01)

(52) U.S. Cl.
CPC ......... *H04R 25/604* (2013.01); *H04R 25/656* (2013.01)

(58) Field of Classification Search
CPC ...... H04R 25/60; H04R 25/604; H04R 25/65; H04R 25/658; H04R 2225/021; H04R 2225/77
USPC .......................................................... 381/322
See application file for complete search history.

(56) References Cited

U.S. PATENT DOCUMENTS 9,961,458 B1 5/2018 Tourdot
2001/0040973 A1 * 11/2001 Fritz .................... A61B 5/6817 381/328
2004/0062410 A1 4/2004 Wagner et al.
2004/0069560 A1 * 4/2004 Widmer ................ B29C 64/182 181/135
2005/0123160 A1 6/2005 Mcintosh
2008/0165982 A1 * 7/2008 Hankey ................... B21C 23/18 381/74
2009/0110221 A1 * 4/2009 Rithinger ............. H04R 25/554 381/312

(Continued)

FOREIGN PATENT DOCUMENTS

EP 3151586 4/2017
WO WO 2009/087243 7/2009

(Continued)

OTHER PUBLICATIONS

Extended European Search Report for EP Patent Appln. No. 19218208.7 dated Jun. 15, 2020.

(Continued)

*Primary Examiner* — Katherine A Faley
(74) *Attorney, Agent, or Firm* — Vista IP Law Group, LLP

(57) ABSTRACT

Described is a hearing device, wherein the engine module is enfolded in an elastic sealing sleeve. The sealing sleeve is configured to fit tightly on the engine module and comprises a sleeve opening configured for allowing the engine module to pass through during assembly or disassembly of the hearing device, and a rigid housing shell covers at least part of the elastic sealing sleeve.

24 Claims, 3 Drawing Sheets

(56) References Cited

U.S. PATENT DOCUMENTS

| | | | | |
|---|---|---|---|---|
| 2009/0245564 | A1 * | 10/2009 | Mittleman ............ | H04M 1/035 381/361 |
| 2011/0110544 | A1 * | 5/2011 | Vestergaard ......... | H04R 25/658 427/255.7 |
| 2012/0057740 | A1 | 3/2012 | Rosal | |
| 2013/0202139 | A1 * | 8/2013 | Lackert ................ | H04R 25/456 381/317 |
| 2014/0205131 | A1 * | 7/2014 | Azmi ................... | H04R 1/1066 381/380 |
| 2018/0242764 | A1 * | 8/2018 | Wynne .................. | A61J 9/0623 |

FOREIGN PATENT DOCUMENTS

| | | |
|---|---|---|
| WO | WO 2009/123563 | 10/2009 |
| WO | WO 2010/040351 | 4/2010 |

OTHER PUBLICATIONS

International Search Report for International Appln. No. PCT/EP2020/086863 dated Feb. 18, 2021.

Foreign OA for CN Patent Appln. No 202080087699.3 dated Jul. 11, 2024.

English Translation of Foreign OA for CN Patent Appln. No 202080087699.3 dated Jul. 11, 2024.

* cited by examiner

SEALING SLEEVE FOR PROTECTION OF COMPONENTS IN A HEARING DEVICE

RELATED APPLICATION DATA

This application is a continuation of International Patent Application No. PCT/EP2020/086863 filed on Dec. 17, 2020, which claims priority to, and the benefit of, European Patent Application No. 19218208.7 filed on Dec. 19, 2019. The entire disclosures of the above applications are expressly incorporated by reference herein.

FIELD

The present disclosure relates generally to a head-wearable hearing device comprising a sealing sleeve, wherein the sealing sleeve enfolds an engine module of the hearing device and a rigid housing shell covers at least part of the elastic sealing sleeve.

BACKGROUND

The components of hearing devices such as e.g. headsets, headphones, earphones, hearing aids etc. are exposed to an array of potentially damaging substances, particularly during use. Examples of such potentially damaging substances are humidity, grease, dirt, dust, perspiration and earwax. Therefore, the components, particularly the electronic components, of hearing devices are shielded to some degree from these potentially damaging substances.

Today, the electronic components of hearing devices are typically shielded by a number of interlocking hard shells made of e.g. plastic, metal or composite materials, and often there will be a plurality of such hard shells protecting the electronic components. Such interlocking hard shells also typically need special tools for disassembly.

When a user wears the hearing device or handles it, the hearing device is exposed to the user's skin and fingers, which may contain substances such as liquids or grease thus increasing the exposure for the hearing device.

Electronic components generally last longer if they are not exposed to humidity, grit, dirt, oily substances, etc., which makes it advantageous to seal off the components. On the other hand, it is also advantageous that a technician is able to gain access to the electronic components, for e.g. repairs or replacements.

Additionally, when using rechargeable batteries as in many of the newer hearing devices and increasingly more and more, the voltage is increased compared to non-rechargeable devices, which further increases the problem of corrosion.

The electronic components of a hearing device are usually held together and in place at least partly by a rigid frame. As described above, the electronic components are sensitive to environmental impacts and by shielding them with an elastic sealing sleeve as disclosed herein, their lifetime may be extended. Besides shielding the electronic components from potentially damaging substances, a sealing sleeve can also reduce shock to the electronic components due to the hearing device being dropped or for other reasons sustaining an impact, which could otherwise cause one or more of the electronic components to stop functioning.

SUMMARY

It is an object to alleviate at least one or more of the above mentioned drawbacks at least to an extent.

Accordingly, a head-wearable hearing device adapted for use at, or in, an ear of a user is provided, where the head-wearable hearing device comprises:

- an engine module, which comprises a plurality of electronic components being held in place partly by a rigid frame,
- an elastic sealing sleeve configured to fit tightly on the engine module, the sealing sleeve comprises a sleeve opening configured for allowing the engine module to pass through during assembly or disassembly of the hearing device, wherein the hearing device further comprises a rigid housing shell covering at least part of the elastic sealing sleeve.

The head-wearable hearing device may be a headset, headphone, earphone, or hearing aid. Particularly, the head-wearable hearing device may be an outside hearing aid, such as a behind-the-ear or receiver-in-ear hearing aid, or an inside hearing aid, such as an in-the-ear hearing aid or custom hearing aid.

An engine module of a head-wearable hearing devices generally comprises a plurality of electronic components, such as e.g. one or more batteries, one or more microphones, printed circuit board circuitry, one or more processors, radio receiver(s), Bluetooth transceiver(s), etc.

In some embodiments, the plurality of electronic components comprises at least one microphone that is adapted to receive incoming sound via a microphone input, and the sealing sleeve further comprises a microphone opening positioned such that sound can travel via the microphone opening to the microphone input. The engine module may comprise more than one microphone, for instance, the engine module may comprise a second microphone being adapted to receive incoming sound via a second microphone input.

In some embodiments, the plurality of electronic components comprises a rechargeable battery. In a further embodiment, the rechargeable battery is configured to have a voltage, when unused and fully charged, of at least 3V, such as at least 3.5V, such as at least 3.7V. The higher the voltage of the battery, the more corrosion becomes a problem for the engine module when it is exposed to the environment. Having a rechargeable battery reduces the need for a user of the hearing device to access the engine module, which makes it less of an inconvenience for the user if the sealing sleeve is further configured such that it cannot be removed from the engine module without the use of one or more tools.

The electronic components are held in place at least partly by a rigid frame. Such a rigid frame is typically made of one or more plastic materials with sufficient rigidity to hold the electronic components in place, but may be made from other suitable material such as e.g. metals, composites, etc. One or more of the components may also be glued together or otherwise fastened within/to the rigid frame and/or each other. The rigid frame may have compartments or support structures, which aid in keeping the electronic components in place. Typically, the rigid frame is a partly open structure, which allows for components such as e.g. one or more buttons and/or microphone inputs to be exposed such that they may respond to relevant input, such as, in the case of a push-button or toggle switch, pressure applied by a user.

The elastic sealing sleeve is made of a soft and compliant material such as e.g. silicone, rubber, or thermal-plastic elastomer (TPE). The thickness of the elastic material may be between 0.03 mm and 2.0 mm, such as between 0.08 mm and 1.0 mm, such as between 0.1 and 0.6 mm, such as between 0.1 and 0.2 mm, depending on the design of the sealing sleeve. The sealing sleeve may have areas, which are thicker than others due to the manufacturing process or by design, e.g. for strength in certain areas.

Usually, due to the thinness of the sealing sleeve, it is not necessary to have an opening in the sealing sleeve in order for a user to be able to apply pressure to e.g. a push-button on the engine module. Further, the sealing sleeve may be made of a material that has at least some transparency thus allowing a user to see the light from an LED through the sealing sleeve such that no opening is needed to make the light from the LED visible from outside the sealing sleeve.

In an embodiment, the sleeve opening, one or more microphone openings and, optionally, a connection opening, are the only openings in the sealing sleeve, which otherwise enfolds the entirety of the engine module.

The sealing sleeve may be manufactured as a single mold, i.e. made as a single piece of elastic material without the need of uniting several pieces together by e.g. fusing, gluing, etc. or it may be made of several pieces, which are then joined to form the sealing sleeve.

The sleeve opening is configured to allow the engine module to be passed through it during assembly or disassembly. The other openings, such as the microphone opening or optionally, connection opening, will in some embodiments be too small for the engine module to pass through, and the sleeve opening is then the only opening in the elastic material, where this is possible. The sealing sleeve is made specifically to fit a given engine module such that it fits tightly around the engine module, i.e. such that it enfolds the engine module closely. In an embodiment, the sealing sleeve is further configured such that it cannot be removed from the engine module without the use of one or more tools. For example, by making the fit of the sealing sleeve so tight that one or more tools are needed to assist in removing it from the engine module without damaging the engine module.

The microphone receives incoming sound from the surrounding environment via the microphone input. When an engine module, having a microphone in it, is enfolded in an elastic sealing sleeve, at least one opening in the sealing sleeve is needed to allow sound to pass to the microphone input. Such a microphone opening for allowing sound to be received via the microphone input thus needs to be positioned such that sound can travel via the microphone opening to the microphone input. This may be achieved by aligning the microphone opening and microphone input, i.e. having the microphone input and microphone opening overlap wholly or partially thus making it possible for sound to travel from the environment to the microphone without being hindered significantly by the sealing sleeve enfolding the engine module. If there is more than one microphone in the engine module, a second microphone opening may be present in the sealing sleeve. It may also be possible to have two or more microphone inputs sharing a single microphone opening by the single microphone opening being positioned such that sound is able to travel via the single microphone opening to the two or more microphone inputs. In an embodiment, the extent, such as the diameter, of the microphone opening is 0.1 mm-2 mm, such as 0.2 mm-1.2 mm, such as 0.2 mm-0.8 mm. In another embodiment, the sleeve opening and the microphone opening are the same, i.e. a single opening having multiple functions.

By the sealing sleeve fitting tightly on the engine module is meant that the sealing sleeve fits closely to the engine module.

The sealing sleeve may fit so tightly on the engine module so as to be watertight, i.e. impermeable to water except when under sufficient pressure to produce structural discontinuity. The openings in the sealing sleeve may be fitted with appropriate filters or have an in-built filter function. Additionally, or alternatively, the engine module may have structures, such as e.g. protrusions, possibly as part of the rigid frame, which create a pressure seal at an opening in such a way that humidity or grease cannot easily enter the engine module or the space in-between the engine module and the sealing sleeve. Thus, the engine module enfolded by the sealing sleeve could be able to withstand at least average humidity and light exposure to water and other liquids, or even more. In an embodiment, the rigid frame comprises a protrusion and the protrusion extends partly through the sleeve opening such that the sleeve opening is sealed by the pressure from the tight-fitting sealing sleeve on the rigid frame at or around the protrusion.

In some types of head-wearable hearing devices, such as e.g. a receiver-in-ear hearing aid, the electronic components in the engine module need to be connected to components that reside outside the hearing device, such as components that reside in the ear of a user during use. If the connection is wired, such as in the form of e.g. a tube and/or conductive wires and/or fibers, the connection may be achieved via the sleeve opening. Alternatively, the sealing sleeve may comprise a connection opening configured to allow connection between one or more of the electronic components and one or more of the components residing outside the hearing device. Thus, the connection opening in the sealing sleeve can provide physical access for the wiring and/or tubing through the sealing sleeve. In an embodiment, the sleeve opening, microphone opening and connection opening are the same, i.e. a single opening having multiple functions. The wired connection through an opening in the sealing sleeve as described above may be protected by a tubular part mounted on the housing shell. Thus, in an embodiment the hearing device further comprises a tubular part mounted on the housing shell and configured for allowing connection between one or more of the electronic components in the plurality of electronic components and one or more components residing outside the hearing aid such as an earmold or a receiver. The tubular part may have any suitable cross-section such as round, oval, square, etc.

The head-wearable hearing device further comprises a rigid housing shell, which covers at least part of the elastic sealing sleeve. Thus, a rigid housing shell wholly or partially encloses the sealing sleeve, which enfolds the engine module. In an embodiment, the rigid housing shell covers the entirety of the sealing sleeve.

The rigid housing shell may further serve various purposes such as added design, e.g. shape, colour, markings etc., or for strengthening parts of the hearing device. With a sealing sleeve protecting the engine module, the engine module and the electronics therein are protected from the environment such as the dirt and grease on the user's hands if the rigid housing shell is removed to be exchanged for another rigid housing shell, for example if the housing shell is damaged or to achieve a different look of the hearing device. This allows for a hearing device model, where the user can change the housing shell as needed or desired, with less risk of a negative impact on the engine module.

If the housing shell covers a part of the sealing sleeve having an opening, the housing shell may need to have a corresponding opening. For example, if the housing shell covers a part of the sealing sleeve having a microphone opening, the housing shell will also need to have an opening configured to allow sound to travel to the microphone input. The housing shell will typically be made of one or more plastics, but may be made of other suitable materials such as e.g. metals, composites, etc. In prior art hearing devices, i.e.

without a sealing sleeve, one or more hard shells are used to protect the electronic components inside from shock and to prevent a user from easily accessing the electronic components. Thus, such hard shells will have properties that are not needed when a sealing sleeve as disclosed herein is used. Therefore, it is an advantage of the sealing sleeve that the rigid housing shell can have different properties than otherwise when a sealing sleeve enfolds the engine module, such as be made of different material and/or only partially covering the sealing sleeve enfolding the engine module.

As an example, the elastic sealing sleeve for enfolding an engine module of a head-wearable hearing device adapted for use at, or in, an ear could be configured to fit tightly on the engine module, and the sealing sleeve could comprise:

a sleeve opening configured for allowing the engine module to pass through during assembly or disassembly of the hearing device, Such a sealing sleeve could further have any of the features described above for a sealing sleeve such as e.g. one or more microphone openings, which during use is positioned such that sound can travel via the microphone opening to a microphone input of the engine module.

DETAILED DESCRIPTION

Figure 1:
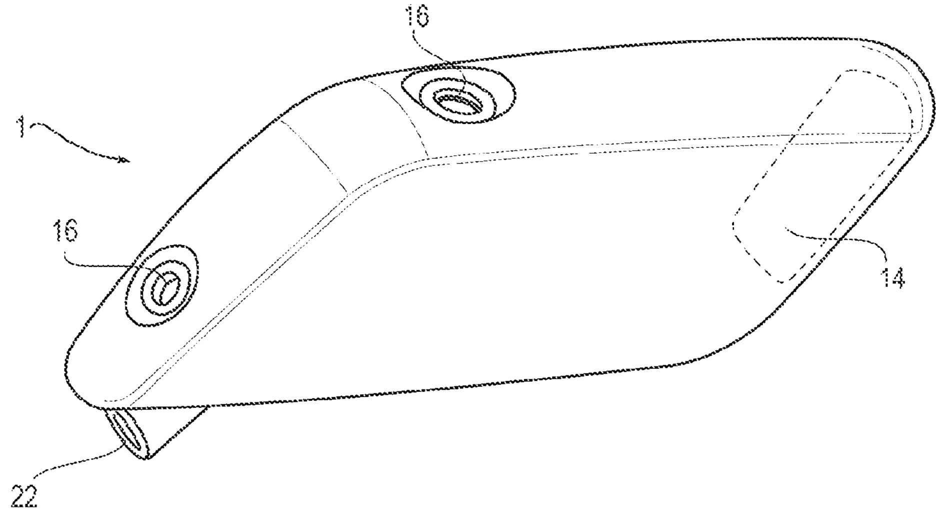
FIG. 1 is a perspective view schematically illustrating an embodiment of an elastic sealing sleeve for enfolding an engine module of a head-wearable hearing device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Various aspects and embodiments of a sealing sleeve for enfolding an engine module and a head-wearable hearing device comprising a sealing sleeve as disclosed herein will now be described with reference to the figures.

FIG. 1 illustrates an embodiment of an elastic sealing sleeve 1 for use with an engine module of a head-wearable hearing device; The sealing sleeve 1 has a sleeve opening 14 through which an engine module 4 can be passed through during assembly or disassembly of the hearing device.

Figure 2:
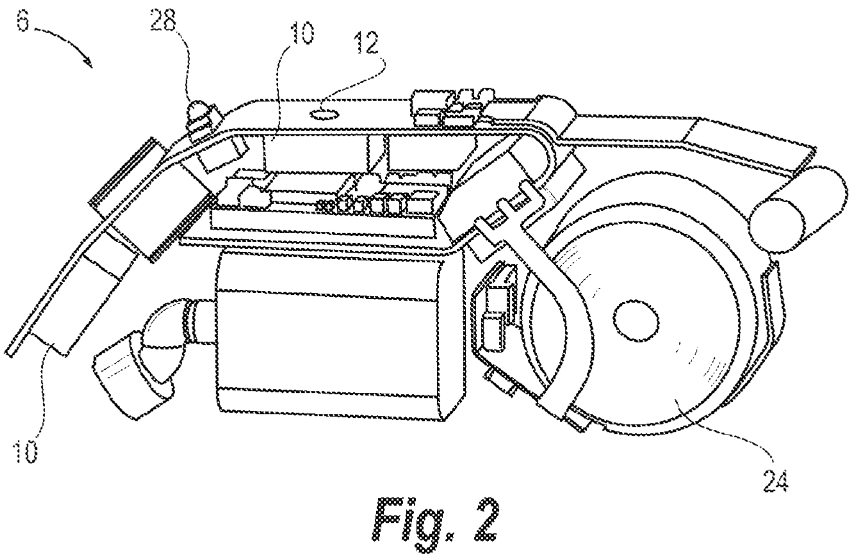
FIG. 2 is an illustration of electronic components that may be present in an engine module.
Figure 3:
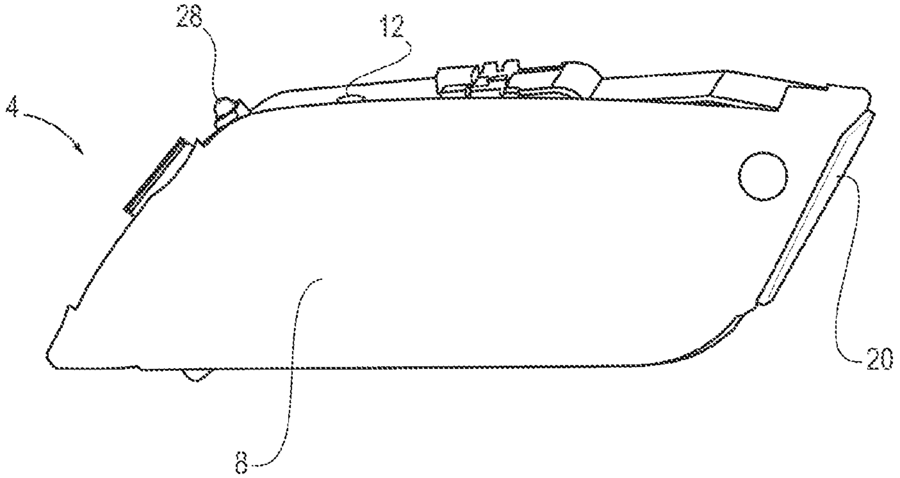
FIG. 3 is an illustration of an embodiment of an engine module comprising a rigid frame holding electronic components.

An engine module 4 of a head-wearable hearing devices comprises a number of electronic components 6, see FIGS. 2 and 3, such as e.g. one or more batteries 24, microphones 10, printed circuit board circuitry, processors, radio receiver(s), Bluetooth™ transceiver(s), etc., which can be shielded by a sealing sleeve 1 as the one shown in FIG. 1.

During assembly, the engine module 4 is inserted into the sealing sleeve 1 through the sleeve opening 14 by stretching the elastic material and rolling it over the engine module 4 to enfold it. The sealing sleeve 1 has to be manufactured to suit the specific engine module 4 that it will enfold so that it will fit tightly and such that further openings in the sealing sleeve 1 will match the needs of the specific engine module 4. An advantage of the sealing sleeve is that no complex tools, such as specialized screwdrivers etc. or the like, are needed to remove or add the sealing sleeve.

The sealing sleeve 1 in FIG. 1 has two microphone openings 16, which are configured to allow sound to travel to a microphone input 12 comprised in an engine module 4 via the microphone openings 16.

The sealing sleeve 1 shown in FIG. 1 is an example of a sealing sleeve suitable for enfolding an engine module 4 of an outside hearing aid, where the electronic components 6 in the engine module 4 need to be connected to components that reside outside the hearing device, such as components that reside in the ear of a user during use. To facilitate wired connection between the electronic components 6 of the engine module 4 and components residing in the ear of the user, the sealing sleeve 1 has a connection opening 22.

The sealing sleeve 1 is always manufactured to fit an engine module 4 having a particular form factor such that the sealing sleeve 1 will fit tightly on the engine module 4 after assembly.

FIG. 2 is an illustration of various electronic components 6 that may be present in an engine module 4 of a hearing device. Specifically shown is: two microphones 10 having microphone inputs 12, an LED 28 and a battery 24. The microphones 10 shown in FIG. 2 are mounted on a printed circuit board surface and are each adapted to receive incoming sound via a microphone input 12 (only one microphone input 12 is visible in FIG. 2).

Figure 4:
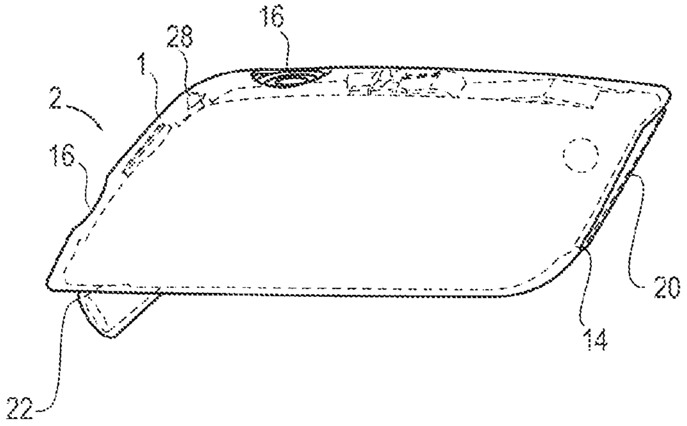
FIG. 4 illustrates an embodiment of a sealing sleeve enfolding an engine module.

In FIG. 3 is shown a rigid frame 8 holding electronic components 6 such as those shown in FIG. 2 in place in an engine module 4. The rigid frame 8 has a protrusion 20, which is configured to fit into the sleeve opening 14 in a sealing sleeve 1, as shown in FIG. 4. The microphone input 12 and LED 28 are not covered by the rigid frame 8, which has an open structure.

FIG. 4 illustrates an embodiment of a sealing sleeve 1 enfolding an engine module 4. The sealing sleeve 1 of FIG. 4 is suitable for an outside hearing aid, such as a behind-the-ear or receiver-in-ear type hearing aid, where the engine module 4 sits behind the ear of the user during use and a tube extends between the hearing aid to a custom earmold that fits inside the user's ear canal, where it will reside during use.

A protrusion 20 on the rigid frame 8, which holds the electronic components 6 in the engine module 4, extends at least partly through the sleeve opening 14 such that the sleeve opening 14 is sealed by the pressure from the tight-fitting sealing sleeve 1.

Two microphone openings 16 in the sealing sleeve 1 are configured to allow sound to pass from the outside to a microphone input 12 in the engine module 4, which is enfolded by the sealing sleeve 1. The microphone openings 16 may be fitted with one or more filters or have in-built filters, which allow sound to pass, but act to keep out dirt, grease, etc. from the engine module 4.

A connection opening 22 in the sealing sleeve 1 is configured to allow the tube to connect one or more of the electronic components 6 in the engine module 4 to one or more components outside the engine module 4. As an example, a receiver-in-ear hearing aid usually has wiring between the receiver, which is in the ear of the user during use, and a processor and/or other electronic component(s) within the engine module. The connection opening 22 is sealed at least partly by the tube extending between the hearing aid and the earmold.

The engine module 4 can be almost completely sealed off from the environment by the sealing sleeve 1. Thus, the sealing sleeve 1 acts to inhibit or even prevent humidity from getting in contact with the electronic components 6 of the engine module 4, which reduces or prevents corrosion of the metallic parts. Further, grit, dust, ear wax, grease, etc. is partially or wholly prevented from entering the engine module 4, which extends the lifetime of the electronic components 6 within. All embodiments of the sealing sleeve 1 fit tightly around the engine module 4 it is made for and therefore it requires some effort to remove the sealing sleeve 1 thus hindering a user of the hearing device from accessing the engine module 4 during normal use of the hearing device. At the same time, a technician can easily access the engine module 4 by simply extracting the engine module 4 from the elastic sealing sleeve 1. In addition, the sealing sleeve 1 may also act to somewhat reduce shock due to the hearing device being dropped or for other reasons sustaining an impact, which could cause one or more of the electronic components 6 in the engine module 4 to stop functioning.

Figure 5:
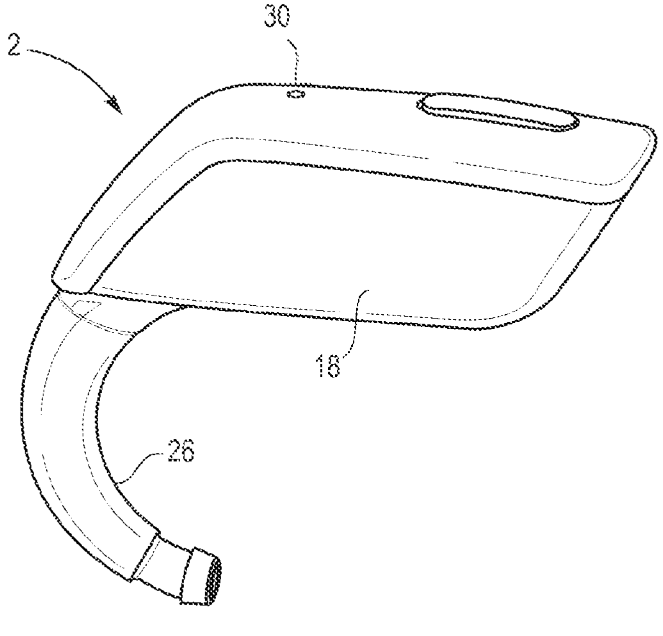
FIG. 5 shows a head-wearable hearing device with a sealing sleeve enfolding an engine module and a rigid housing shell covering the sealing sleeve.

In FIG. 5 is shown an embodiment of a head-wearable hearing device, where the rigid housing shell 18 covers the sealing sleeve in its entirety. Due to the protection provided by the sealing sleeve 1, the rigid housing shell 18 is not alone in safeguarding the engine module 4 and can be made e.g. to be lighter and/or from a different material compared to a hard shell that is alone in protecting the engine module 4. This also allows the rigid housing shell 18 to have a different construction from a hard shell that must safeguard the engine module 4 alone and the rigid housing shell 18 is more flexible with respect to satisfying design purposes other than protection of the engine module 4.

In FIG. 5 can also be seen corresponding microphone openings 30 in the housing shell, which align with microphone openings 16 in the sealing sleeve 1, as seen in FIG. 4.

Also shown in FIG. 5 is a tube 26 for connecting one or more of the electronic components in the engine module to one or more components outside the engine module. The connection opening 22 in the sealing sleeve, seen in FIG. 4, which allows for a wired connection out of the engine module 4 is protected by the tubular part 26, also known as a hook, mounted on the housing shell 18. The tubular part 26 shown in FIG. 5 is round, but may in other embodiments have a different cross-section such as round, oval, square, etc.

Some preferred embodiments have been shown in the foregoing, but it should be stressed that the claimed invention is not limited to these, but may be embodied in other ways within the subject matter defined in the claims.

In the claims enumerating several features, some or all of these features may be embodied by one and the same element, component or item. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

1 sealing sleeve
2 head-wearable hearing device
4 engine module
6 electronic components
8 frame
10 microphone
12 microphone input
14 sleeve opening
16 microphone opening
18 housing shell
20 protrusion
22 connection opening
24 battery
26 tube
28 LED
30 microphone opening in housing shell

The invention claimed is:

1. A hearing device comprising:
a rigid frame;
a plurality of electronic components being held in place at least partly by the rigid frame;
an elastic sealing sleeve configured to fit around the rigid frame, the sealing sleeve comprising a sleeve opening configured for allowing the rigid frame to pass through during assembly or disassembly of the hearing device, wherein the elastic sealing sleeve is configured to surround the electronic components and a majority of the rigid frame;
wherein the hearing device further comprises a rigid housing shell covering at least a part of the elastic sealing sleeve, and wherein the elastic sealing sleeve is more elastic than the rigid housing shell that covers the at least the part of the elastic sealing sleeve; and
wherein the elastic sealing sleeve is configured for placement between the rigid frame and the rigid housing.

2. The hearing device according to claim 1, wherein the plurality of electronic components comprises a microphone, wherein the sealing sleeve further comprises a microphone opening, and wherein the microphone is configured to receive sound via the microphone opening at the sealing sleeve.

3. The hearing device according to claim 1, wherein the plurality of electronic components comprises a rechargeable battery.

4. The hearing device according claim 3, wherein the rechargeable battery is configured to have a voltage, when unused and fully charged, of at least 3V.

5. The hearing device according to claim 1, wherein the sealing sleeve is removeable from the rigid frame without the use of one or more tools.

6. The hearing device according to claim 1, wherein a thickness of the elastic sealing sleeve is anywhere between 0.03 mm and 2.0 mm.

7. The hearing device according to claim 1, wherein a thickness of the elastic sealing sleeve is anywhere between 0.08 mm and 1.0 mm.

8. The hearing device according to claim 1, wherein a thickness of the elastic sealing sleeve is anywhere between 0.1 and 0.6 mm.

9. The hearing device according to claim 1, wherein the elastic sealing sleeve is made of silicone, rubber, or thermal-plastic elastomer (TPE).

10. The hearing device according to claim 1, wherein the elastic sealing sleeve comprises one or more microphone openings, and wherein the sleeve opening and the one or more microphone openings are the only openings at the elastic sealing sleeve.

11. The hearing device according to claim 1, wherein the elastic sealing sleeve also comprises a connection opening and one or more microphone openings, and wherein the sleeve opening, the connection opening, and the one or more microphone openings are the only openings at the elastic sealing sleeve.

12. The hearing device according to claim 1, wherein the elastic sealing sleeve is manufactured as a single mold.

13. The hearing device according to claim 1, wherein the rigid frame comprises a protrusion configured to extend at least partly through the sleeve opening to plug the opening.

14. The hearing device according to claim 1, wherein the head-wearable hearing device is a hearing aid, and wherein the elastic sealing sleeve is a behind-the-ear (BTE) sleeve.

15. The hearing device according to claim 14, wherein the hearing aid comprises a behind-the-ear hearing aid or a receiver-in-ear hearing aid.

16. The hearing device according to claim 14, wherein the sealing sleeve comprises a connection opening configured to allow connection between one or more of the electronic components and one or more components outside the hearing device.

17. The hearing device according to claim 16, wherein the one or more components comprise an earmold or a receiver.

18. The hearing device according to claim 16, further comprising a tubular part mounted on the rigid housing shell and configured to allow the one or more of the electronic components to be connected to the one or more components outside the hearing device.

19. The hearing device according to claim 1, wherein the elastic sealing sleeve comprises a proximal side, and wherein the rigid housing shell covers at least a part of the proximal side of the elastic sealing sleeve.

20. The hearing device according to claim 1, wherein the elastic sealing sleeve is made from a compliant material.

21. The hearing device according to claim 1, wherein the elastic sealing sleeve is made from a material that is softer than a material of the rigid housing shell.

22. The hearing device according to claim 1, further comprising a printed circuit board, wherein the rigid frame is different from the printed circuit board.

23. A hearing device comprising:

a rigid frame;

a plurality of electronic components being held in place at least partly by the rigid frame;

an elastic sealing sleeve configured to fit around the rigid frame, the sealing sleeve comprising a sleeve opening configured for allowing the rigid frame to pass through during assembly or disassembly of the hearing device, wherein the elastic sealing sleeve is configured to surround the electronic components and a majority of the rigid frame;

wherein the hearing device further comprises a rigid housing shell; and wherein the elastic sealing sleeve is a behind-the-ear (BTE) sleeve configured for placement between the rigid frame and the rigid housing.

24. The hearing device according to claim 23, further comprising a printed circuit board, wherein the rigid frame is different from the printed circuit board.

* * * * *